US007054898B1

(12) United States Patent
Tzeng et al.

(10) Patent No.: US 7,054,898 B1
(45) Date of Patent: May 30, 2006

(54) ELIMINATION OF END-AROUND-CARRY CRITICAL PATH IN FLOATING POINT ADD/SUBTRACT EXECUTION UNIT

(75) Inventors: Allan Tzungren Tzeng, San Jose, CA (US); Choon Ping Chng, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 558 days.

(21) Appl. No.: 09/632,235

(22) Filed: Aug. 4, 2000

(51) Int. Cl.
*G06F 7/38* (2006.01)

(52) U.S. Cl. ...................................... 708/495

(58) Field of Classification Search ........ 708/495–514, 708/670
See application file for complete search history.

(56) References Cited

U.S. PATENT DOCUMENTS

| | | | | |
|---|---|---|---|---|
| 5,111,421 A | * | 5/1992 | Molnar et al. ............. | 708/505 |
| 5,247,471 A | * | 9/1993 | Hilker et al. .............. | 708/505 |
| 5,272,660 A | * | 12/1993 | Rossbach .................. | 708/504 |
| 5,487,022 A | * | 1/1996 | Simpson et al. ........... | 708/495 |
| 5,677,861 A | * | 10/1997 | Inoue et al. ............... | 708/505 |
| 5,685,009 A | | 11/1997 | Blomgren et al. | |
| 5,696,955 A | | 12/1997 | Goddard et al. | |
| 5,761,103 A | * | 6/1998 | Oakland et al. ........... | 708/497 |
| 5,790,445 A | * | 8/1998 | Eisen et al. ............... | 708/505 |
| 6,061,707 A | * | 5/2000 | Dibrino et al. ............ | 708/505 |
| 6,148,316 A | * | 11/2000 | Herbert et al. ............ | 708/497 |
| 6,205,461 B1 | * | 3/2001 | Mansingh .................. | 708/497 |
| 6,298,367 B1 | * | 10/2001 | Oberman et al. .......... | 708/495 |

OTHER PUBLICATIONS

Stamatis et al., S/370 Sign-Magnitude Floating-Point Adder, Aug. 1989, IEEE Journal of Solid-State Circuits vol. 24, No. 4, pp. 1062-1069.*

* cited by examiner

*Primary Examiner*—Kakali Chaki
*Assistant Examiner*—Chat C. Do
(74) *Attorney, Agent, or Firm*—Martine Penilla & Gencarella, LLP

(57) ABSTRACT

A processor having a floating point execution unit with improved parallelism in the adder (add/subtract) unit is disclosed. A preferred aspect of the invention is a new use of the compare logic in the floating point execution unit, coupled with an end-around-carry bit value calculator, to allow the correct rounding choice of the operands to be made before the mantissa portions of the operands are subtracted (added) rather than after.

4 Claims, 5 Drawing Sheets

Block Diagram Of Relevant Portion Of A Floating Point Execution Unit With Present Invention Typical Prior Art Processor Architecture Prior Art Functional Pipeline Block Diagram Of Relevant Portion Of A Floating Point Execution Unit With Present Invention Functional Pipeline
With Present Invention

ELIMINATION OF END-AROUND-CARRY CRITICAL PATH IN FLOATING POINT ADD/SUBTRACT EXECUTION UNIT

BACKGROUND OF THE INVENTION

1. Field of the Invention

This invention pertains generally to processor architecture, focussing on the execution units. More particularly this invention is directed to an improved processor using improved floating point execution units. The time needed to carry out a subtraction in the adder portion of a floating point execution unit is reduced by increasing parallelism within the adder.

2. The Prior Art

The present disclosure pertains to processor architecture. Generally processors, their architectures, and their use in computer systems are well known in the art. An example of a known processor is the UltraSPARC-IIi™ microprocessor available from Sun Microsystems, Inc. An example of a system using a processor such as the UltraSPARC-IIi™ is the Sun Ultra 5™ Workstation running the Sun Solaris™ operating system. As will be well known by a person of ordinary skill in the art, processors and the systems in which they are installed come in a wide variety including those from Microsoft™ using Intel™ processors, Hewlett Packard™ processors in HP™ workstations running HP-UX™, and many more.

Processors include internal components including local register files or local register stores, and execution units that use the local register stores to retrieve and store the values on which the instructions operate. One type of execution unit is the floating point execution unit. These architectural components are well known in the processor art and are widely employed in processor architectures from many suppliers.

Figure 1:
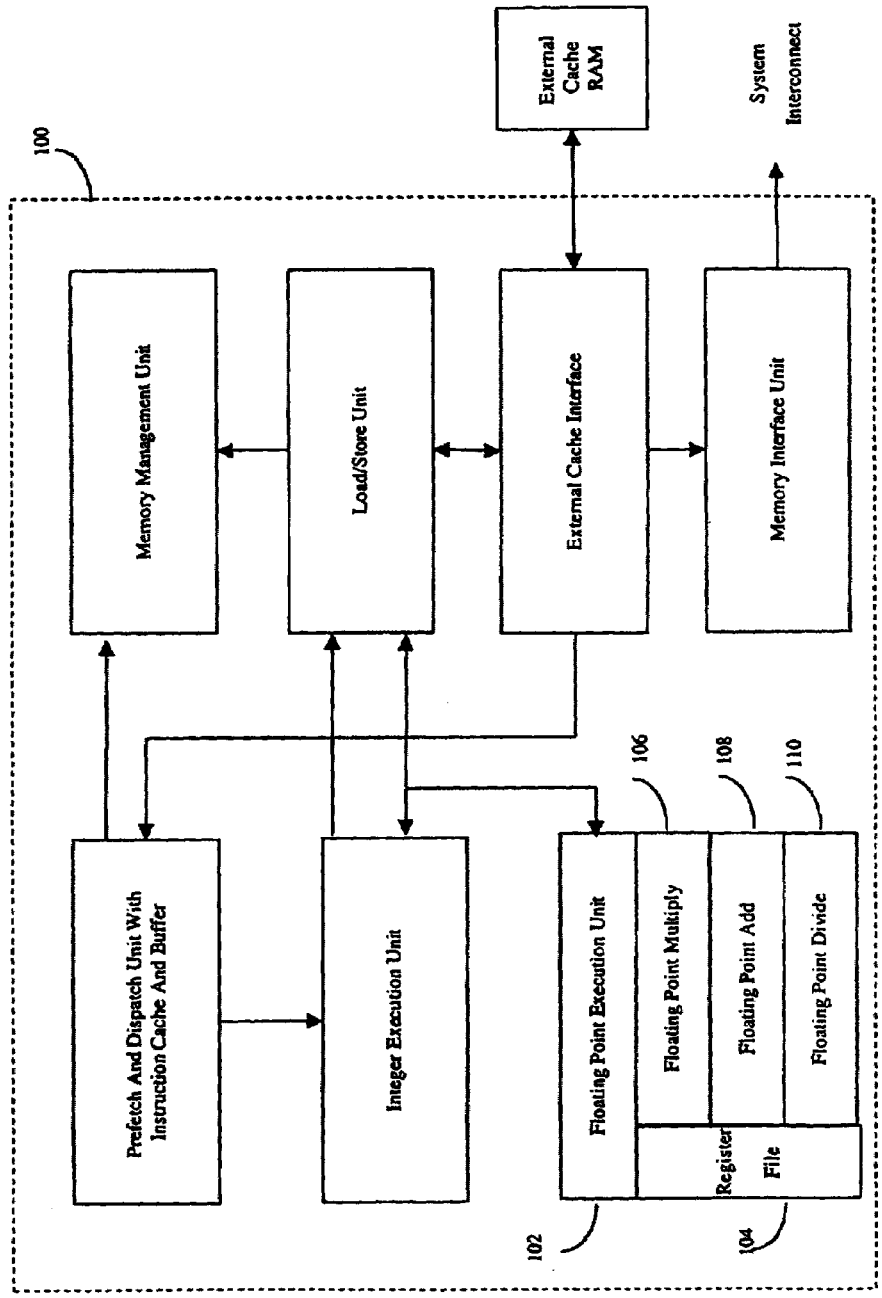

A typical processor architecture 100 is shown in FIG. 1. Floating Point Execution Unit 102 has further internal units designed for different operations. The values used by instructions are stored in Register File 104, where Floating Point Multiply 106, Floating point Add/Subtract 108, or Floating Point Divide 110 retrieve the values using address fields in the individual instructions sent to each of the execution units. The values are operated on as per the instruction in the execution unit, and the result stored back into Register File 104. The address of the storage location indicating where to write the result of the operation just completed is also in the instruction.

As is well known in the art, subtraction of floating point numbers is carried out using two's compliment. When subtracting two floating point numbers the lesser of the numbers has its exponent made equal to the larger by shifting its mantissa to the right the correct number of places, the subtrahend mantissa is bit-wise complimented, added to the larger number's mantissa, and the end-around-carry bit added to the least significant bit (LSB) of the resulting sum. Thus, subtraction is logically executed as addition. Floating point execution units always contain an adder which actually executes both the addition and the subtraction of floating point numbers.

The most commonly executed instruction in a floating point unit is the floating point add (as explained above, used for both addition and subtraction). Floating point adders must be as fast as possible to allow floating point calculations to complete in as few clock cycles as possible. This is needed in order to keep up with the rest of the instruction stream that is pipelined in the processor. Recent substantial increases in the clock speed of processors has also brought additional pressure to bear on floating point adders, as there is now even less time per cycle in which to execute long logic steps. The addition and rounding of the mantissas is the longest portion of the flow, a primary reason being the time it takes to add and round numbers having large numbers of bits (e.g., 53 bits in the case of an IEEE 754 compliant 64-bit floating point number). Thus, floating point adders need to complete complex logical operations and yet to be as simple and as fast as possible in order to keep up with ever-increasing pipelined instruction streams and simultaneously decreasing clock cycles found in current processors.

One of the difficulties in designing faster floating point adders is that parallelism is not obviously inherent in the algorithms used in the adders (compare this to many graphical calculations involving vector sums, where there is extensive parallelism visible on the face of the algorithms and calculations). The steps used in a floating point addition and subtraction operation are discussed in more detailed below.

In general floating point numbers contain a sign portion consisting of one bit, an exponential portion consisting of a certain number of bits, and a mantissa which also consists of a certain number of bits. For the purposes of this disclosure it will be assumed floating point numbers are in IEEE 754 compliant format, although it will be obvious to those of ordinary skill in the art that the discussions and improvements disclosed herein are not limited to IEEE 754 compliant floating point numbers, values, or representations.

Generally, a floating point adder takes two floating point operands and as its first step, makes the exponents equal so the resulting mantissas may be added. This is accomplished by shifting the radix point of the smaller number to the left the number of places needed to equalize the exponents. The mantissas are then added (for subtraction, the two's compliment of the smaller number is added). After adding, the GRS (Guard Round Sticky) bits are assigned or calculated. In the case of the Guard and Round bits, these are the two bits immediately to the right of the least significant bit of the representable size of the mantissa, before rounding has occurred. The Sticky bit is calculated, being the result of an OR applied to any bits to the right of the Round bit (if there are none, it is assigned 0). As is well known in the art, the GRS bits are used during rounding operations. As such, the GRS bits must be assigned or calculated after the mantissas are summed but before rounding can start. Using the GRS bits as well as other input (for example, the rounding mode contained in the instruction), the steps of determining the rounded value begin.

After determining a rounded value, the exponent portion and the sign portion of the operands are computationally combined and the resulting number put into a IEEE 754 compliant format.

Although implementing a floating point adder is done with as much parallelism as possible, it can be seen from the last paragraphs that for the stages consisting of mantissa alignment, mantissa summation, generation of the GRS bits, rounding calculations, and finally the assembly of the final result, there appears to be no place for parallel computations. Each step is dependant on the results of the previous one.

Given the ever increasing demand to reduce the time it takes to complete calculations in the adder portion of a floating point execution unit coupled with the sequential nature of floating point additions and subtractions, there is an urgent need to identify and use any portion of the calculations that can be made parallel.

Accordingly there is a need to provide parallelism in the adder portion of a floating point execution unit, specifically providing for parallelism during subtraction of floating point numbers where the GRS bits and the rounding choice may be computed while the mantissas are still being added. There is also a need to implement any improvement using a minimal amount of new circuitry, thereby keeping the execution time and implementation costs low.

It is therefore a goal of this invention to provide a method and system for finishing the computation of an end-around-carry bit, GRS bits, and a rounding choice for two operands before the summation of two mantissas associated with the same exponent completes, implemented using a minimal amount of additional circuitry as possible.

BRIEF DESCRIPTION OF THE INVENTION

The invention addresses the above identified needs by presenting a method and device that allows additional parallelism in a floating point adder unit. According to the present invention, this additional parallelism can be gained with a minimal amount of additional circuitry in a processor.

A processor having at least one floating point unit, an adder unit within the floating point unit, and a compare unit coupled with a new end-around-carry value calculator is disclosed. The end-around-carry value calculator receives output from the compare unit and sends output to a rounding value calculator, thus allowing a correct rounded choice to be made before, rather than after, the adder unit has finished adding the mantissa portions of the operands.

This provides a significant increase in parallelism by removing a set of calculations from the critical path through the adder unit.

BRIEF DESCRIPTION OF THE DRAWING FIGURES

Figure 2:
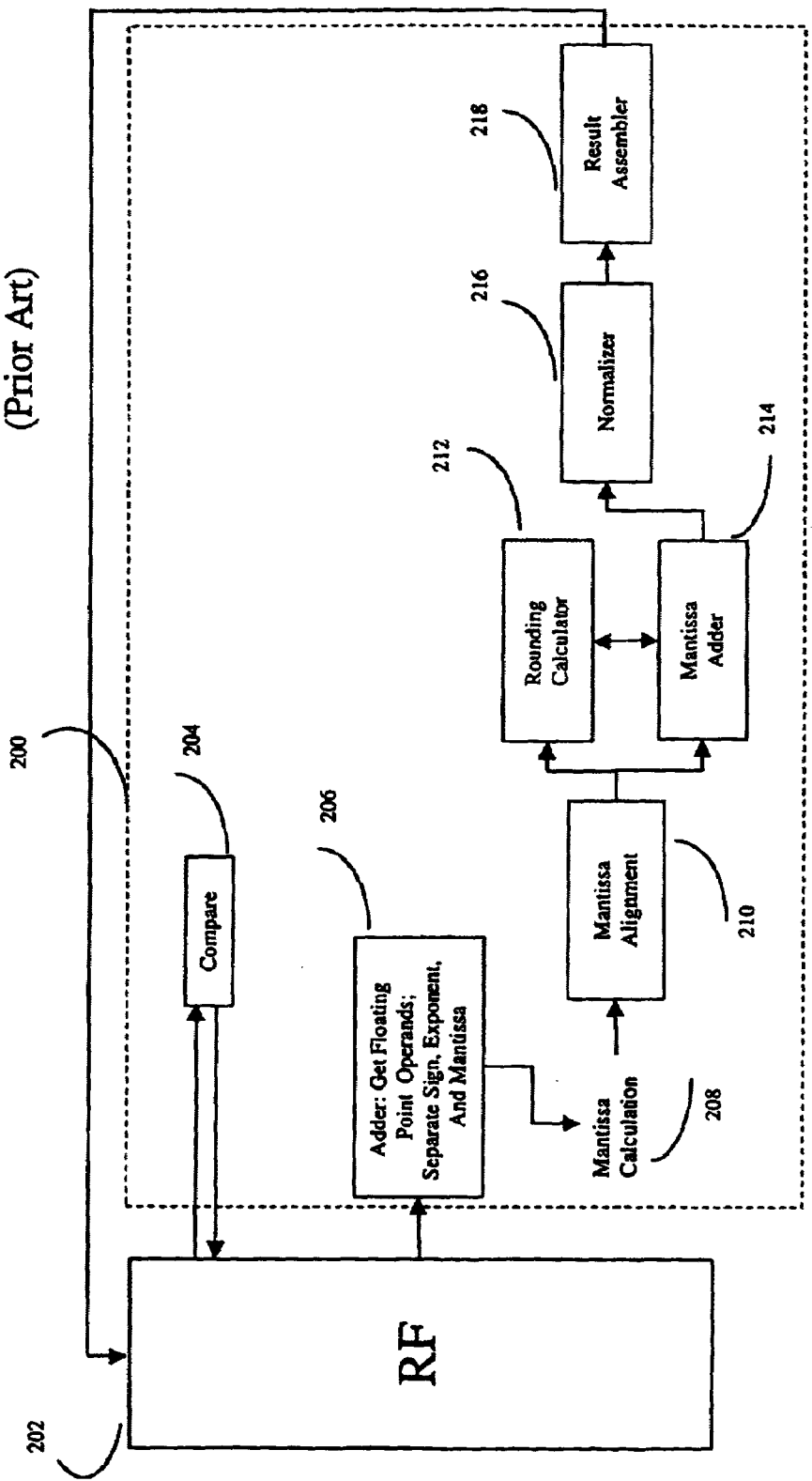
Figure 3:
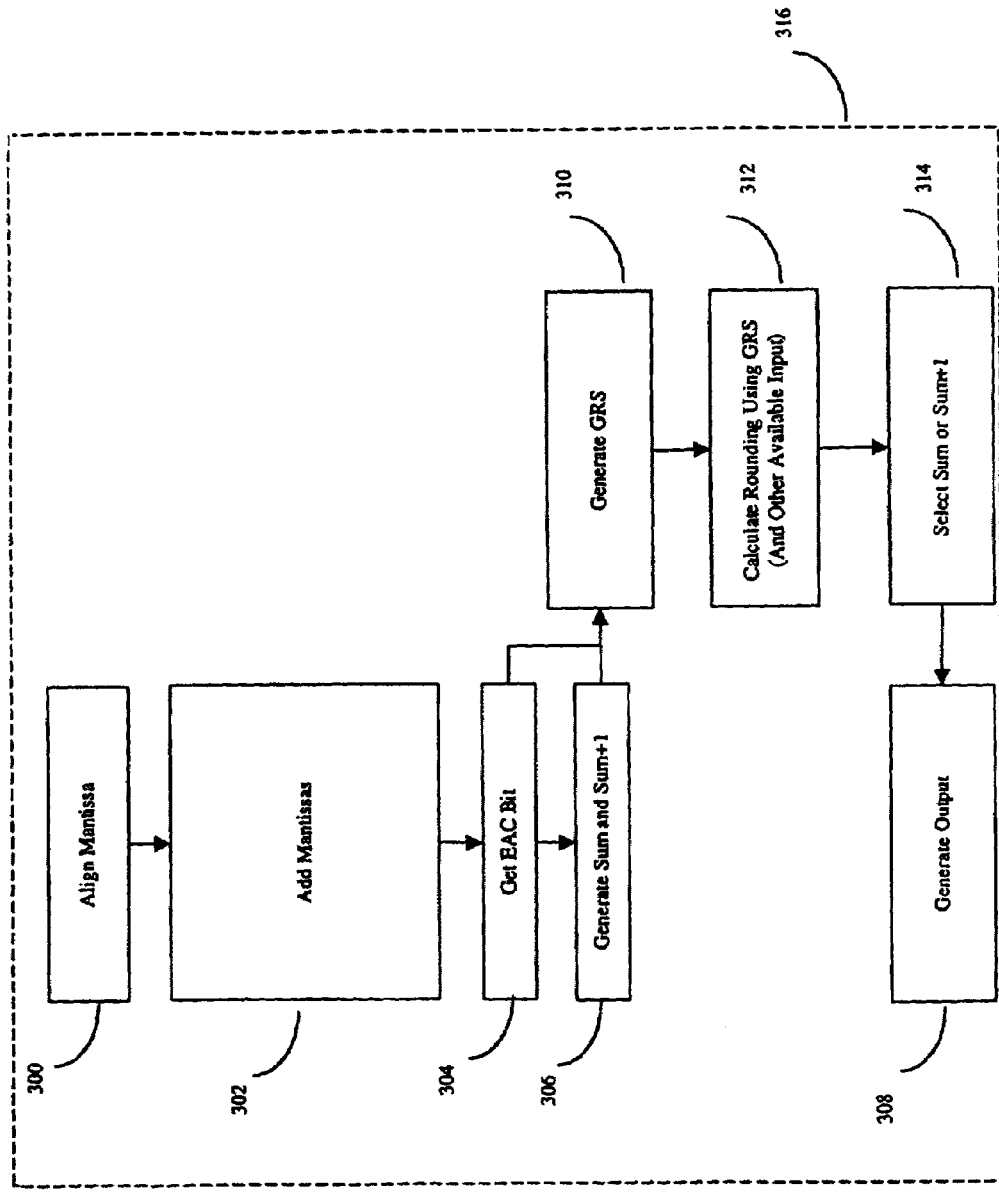
Figure 4:
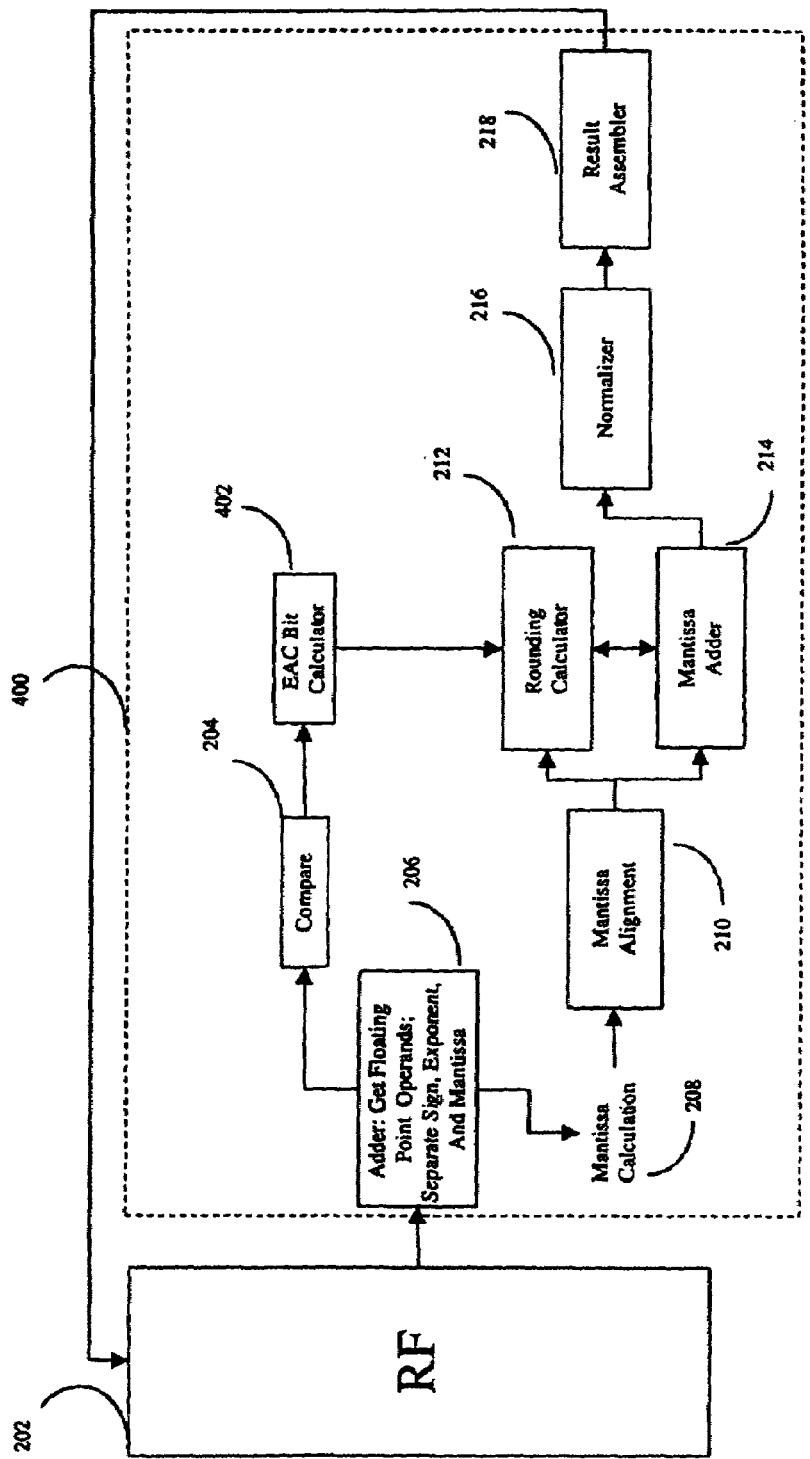
Figure 5:
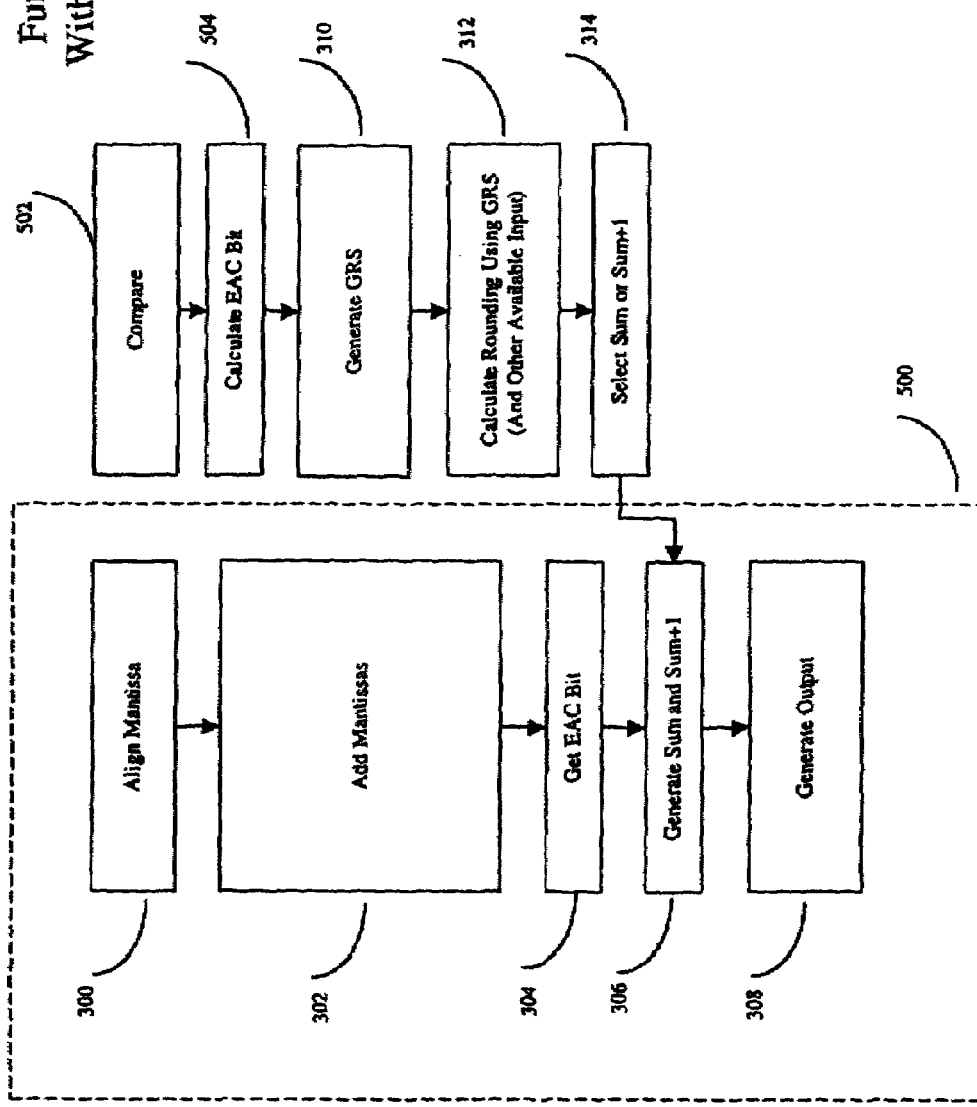

FIG. 1 is a prior art functional diagram of a processor.
FIG. 2 is a prior art functional diagram of relevant portions of a floating point execution unit.
FIG. 3 is a prior art functional pipeline showing relevant portions of a floating point execution unit.
FIG. 4 is a functional diagram of relevant portions of a floating point execution unit showing the disclosed invention.
FIG. 5 is a functional pipeline showing relevant portions of a floating point execution unit with the disclosed invention.

DETAILED DESCRIPTION OF PREFERRED EMBODIMENTS

Person of ordinary skill in the art will realize that the following descriptions of the present invention is illustrative only and not in any way limiting. Other embodiments of the invention will readily suggest themselves to such skilled persons having the benefit of this disclosure.

Similar designations used in this disclosure are intended to designate substantially similar matter.

When referring to floating point numbers, values, or other representations or descriptions having the properties of floating point numbers in this disclosure, it will be clear to a person of ordinary skill in the art and with the benefit of the present disclosure that unless specifically called out as distinguishable, such descriptions mean the same floating point entity.

FIG. 1 shows a portion of typical processor. After individual instructions are retrieved and processed, including steps well-known in the art such as decoding and operand resolution, the instructions are ready to execute (these steps are not illustrated). The values on which they will execute are put into Register File 104. It will recognized by those of ordinary skill in the art that a processor may have a plurality of register files serving a plurality of floating point execution units.

FIG. 2 shows a portion of a typical floating point execution unit in functional blocks, with logical boundary 200. To avoid clutter and stay focussed on the aspects of a floating point execution unit that are of importance to this disclosure, only relevant portions of a full floating point execution unit are shown. For the same reasons only relevant portions of an adder unit within the floating point execution unit are shown.

Again in FIG. 2, Register File 202 provides a readable and writable location for the values on which instructions will operate, in this case floating point values. In the prior art, Compare Unit 204 operates independently of the Adder, shown in relevant part as functional blocks 206–218. Adder 206 retrieves two floating point values from Register File 202, then separates each of the two floating point values into their components consisting of a sign, an exponent, and a mantissa. The functional paths of the sign and exponent portions are as is known in the art and are not shown. Mantissa Calculation path 208 starts with Mantissa Alignment 210, where the exponents are equalized by shifting the radix point of the mantissa with the lowest exponent to the left until its exponent is equal to the value of the higher exponent. If the exponents are equal, no shifting is done. Note that when the exponents are not equal, it will always be known which of the two operands is smaller. When the exponents are equal, it is not yet known which operand is smaller.

In the case of subtracting two mantissas, 2's compliment form is used. 2's compliment is performed by bit-wise negating the subtrahend which is the lesser of the two operands, adding the uncomplimented and complimented operands together, and finally adding one to the least significant bit (LSB) of the resulting sum. In this case the LSB is the LSB of the entire sum, including unrepresentable bits. In general when adding two numbers the entire result will be longer, that is have more bits, than can be represented in standard form. If this were not the case rounding would be unnecessary. In these cases there are two LSBs; one is the LSB of the entire result and one is the LSB of the representable portion of the result. The two LSBs will be distinguished by description in the present disclosure.

Mantissa Adder 214 performs the 2's compliment transformation (for subtraction) on the lesser of the operands and then carries out the addition. A carry-out bit, called the end-around-carry (EAC) bit, results from the addition just performed. The EAC bit value is communicated to Rounding Calculator 212.

The EAC is then used to generate the GRS value. In FIG. 2 this step is subsumed in the Rounder Calculator 212. The GRS value is three bits, consisting of the value of the Guard bit, the value of the Round bit, and the value of the Sticky bit. The Guard and Round bits are the values of the two bits immediately to the right of the LSB of the representable portion of the sum, in the sum just completed in Mantissa Adder 214. The sticky bit is calculated by OR'ing together all the bits to the right of the Round bit (if there are none, it is given the value of 0). Because the value of the GRS is dependant on both the final position of the LSB of the representable portion of the sum after addition, and the values of the bits to the right of the same LSB, its value is calculated after Mantissa Adder 214 completes its addition and makes the EAC bit value known.

The next step is to determine which rounding result to use. This calculation is carried out in Rounding Calculator 212. There are four common rounding modes which after computation result in one of two choices: the original sum, or, the original sum with 1 added to the LSB of the representable portion of the sum (sum+1). The four rounding modes are RZ (Round Zero), RH (Round High), RL (Round Low), and RN (Round Nearest). Using the GRS plus the sign bits, the correct rounding choice results are as follows. The LSB referred to in the definitions below is the LSB of the representable portion of the sum.

RZ=Truncate (delete bits to the right of the LSB)
RH=If (one or more bits to the right of the LSB are 1) then
    If number is positive add 1 to the LSB
    If number is negative truncate (delete bits to the right of the LSB)
RL=If (one or more bits to the right of the LSB are 1) then
    If number is positive truncate (delete bits to the right of the LSB)
    If number is negative add 1 to the LSB
RN=If (bits to the right of the LSB are numerically closer to one number) then
    If closer to lower number, truncate
    If closer to higher number add 1 to LSB
    If exactly ½ way between the two numbers pick the nearest
        even number and round to it—this will result in a truncate or
        add 1 to LSB, depending on which is the even number The key result to note from the above discussion of rounding is that there are, in the end, one of two values that will be needed for the correct rounding result—either the sum or the sum+1. Rounding Calculator 212 makes the calculations necessary to establish which of those two results is the correct one. The actual calculation of sum and sum+1 is done in Mantissa Adder 214.

Rounding Calculator 212 communicates to Mantissa Adder 214 which result, sum or sum+1, is the correctly rounded result to use. Mantissa Adder 214 sends the correct choice to Normalizer 216. Normalizer 216 puts the number into a correctly normalized form, then passes the normalized number to Result Assembler 218. Result Assembler 218, using the normalized results, sign bits (not shown), and exponent calculations (not shown), puts the overall result into IEEE-754 compliant form. Finally, Result Assembler 218 sends the assembled number to a pre-determined register in the Register File 202.

FIG. 3 shows the functional pipeline associated with FIG. 2. The overall pipeline is enclosed in the dotted-line box shown as 316. Starting with the mantissa alignment step Shift Mantissa 300, the next execution step is Add Mantissas 302. This functional step includes producing a 2's compliment form of the subtrahend as well as performing the addition of the uncomplimented and complemented mantissas. Only after Add Mantissas step 302 completes can the EAC bit be accessed, step 304. The step of Generate Sum and Sum+1 306, is finished within a very few clock cycles of making the EAC bit available at step 304. The steps of Generate GRS 310, Calculate Rounding Choice 312, and Select Sum or Sum+1 314, must complete while step 308, Generate Output, waits. When the final selection is made in Select step 314, Generate Output 308 uses the input from Select step 314 to make the correct final result available to the rest of the floating point execution unit and the processor.

In a preferred embodiment of the invention shown in FIG. 4, the dotted-line box 400 logically encloses the relevant portion of a floating point execution unit with an embodiment of the present invention. The floating point values to be subtracted are sent to Compare Unit 204 simultaneously to being sent along Mantissa Calculation path 208 to Mantissa Adder 214. Compare Unit 204 functions by subtracting the first number from the second, using the 2's compliment form of the subtrahend and ignoring the sign bit. When the two exponents are equal the compare operation becomes equivalent to subtracting the two mantissas. Amongst other output, Compare Unit 204 provides a carry-out bit value resulting from the compare calculation. As will be discussed later in this disclosure, the carry-out bit can be used to calculate the EAC. To understand how to calculate the EAC using the carry-out bit value, EAC values are explained more fully.

When discussing the subtraction of two mantissas it was assumed the order of the operands was known, so the smaller value was always subtracted from the larger. In actual implementations it is not always known which is the larger number. The two cases that cover all possibilities are described below. Also discussed is the EAC bit value and how it is used in each case.

Case 1: The exponents are not equal in the original numbers. When the exponents are not equal, the larger number is always the number with the larger exponent. The larger exponent is easy to determine because of the relatively small number of bits of which it is comprised (e.g., 8 in an IEEE-754 compliant 32 bit floating point number); the larger of the two is determined during the separation phase of Adder 206. The two mantissas are then sent in proper order, larger minus smaller, to the adder unit (Mantissa Adder 214). When arriving at Mantissa Adder 214 the larger mantissa is still in normalized form, meaning it has a 1 in the most significant bit (MSB) position. The smaller mantissa will always have a 0 in the MSB position because, with unequal exponents, it will always have been shifted right (radix shifted left). Therefore when the smaller mantissa is complimented it will always have a 1 in the MSB position. When the two mantissas are now added there will always be a carry-out bit, in this case the EAC, with value 1. Thus, when the exponents are unequal there will always be an EAC bit with value 1.

Case 2: When the two exponents are equal, it will not be known which mantissa is larger when they arrive at the adder unit (Mantissa Adder 214). The subtraction is simply carried out in the order in which the mantissas arrived. If the larger is subtracted from the smaller (using 2's compliment form), there will be an EAC bit with value 1 as explained above. If the smaller is subtracted from the larger (using 2's compliment form), the EAC will be 0. Thus, the EAC is only 0 when the subtraction has been done in the wrong order. When the EAC is 0 the correct answer to the subtraction is obtained by taking the compliment of the sum of the two operands, before adding 1 to the LSB of the entire sum. Thus, when the exponents are equal the EAC will be either 0 or 1. If the EAC is 1 the order of subtraction was correct, 1 is added to LSB of the entire sum, and the EAC is made available to calculate rounding. If the EAC is 0 the order of subtraction is incorrect, the sum is bit-wise negated, and the EAC is made available to calculate rounding.

Looking just at the EAC values, when the exponents are not equal the EAC is always 1, when the exponents are equal the EAC is one when the larger mantissa is subtracted from the smaller and 0 when the smaller mantissa is subtracted from the larger. This logical behavior is used to calculate the EAC from Compare Unit 204's carry-out bit value.

Compare Unit 204 subtracts operand one from operand two in order to do the compare, using 2's compliment form.

In the case where the exponents are equal, this is logically the same as subtracting the two mantissas. If the subtraction is carried out in the correct order (larger minus smaller) there will be a carry-out bit value of 1 (left overflow); if the subtraction is carried out in the wrong order (smaller minus larger) there will be no overflow, so the carry-out bit value will be 0.

The EAC bit value is calculated using the output from Compare Unit 204 in EAC Calculator 402. EAC Bit Calculator 402, also receiving which if any exponent is the larger, calculates the EAC bit as follows:

If (exponent_1 equals exponent_2) then
   EAC bit value=Carry-out bit value
If (exponent_1 does not equal exponent_2) then
   EAC bit value=1

EAC Bit Calculator 402 sends the EAC bit value to Rounding Calculator 212. Rounding Calculator 212 can now generate the GRS and calculate which rounding choice to make (sum or sum+1) without waiting for Mantissa Adder 214 to complete and the carry-out bit to be propagated. This result is used when the exponents are equal, meaning when there will have been no shifting of the mantissas.

It will be appreciated by persons of ordinary skill in the art and given the benefit of the present disclosure that EAC-bit Calculator 402 can be implemented in a number of ways. Readily discernable implementations span the range from a wholly microcoded implementation, to a logic implementation embedded as separate circuitry in the processor chip, to some combination of circuitry and microcode. It is contemplated that the inventive features of the current invention encompass these and other implementations that will come to mind to those of ordinary skill in the art with the benefit of the present disclosure.

The significant improvement this makes in pipelining is shown in FIG. 5. The overall critical path through the applicable portion of floating point execution unit is shown within dotted-line box 500. The pipeline for calculating the sum of the mantissas starts as before. The mantissas are aligned (step 300), then the relatively time-intensive process of adding them starts (step 302). After the addition in step 302 completes, the EAC bit is available (step 304) and the two choices, sum and sum+1, are calculated (step 306). Finally the correct output is generated at step 308. While this pipeline runs another independent pipeline is also processing. The compare logic is used to compare the two floating point numbers (step 502) whose mantissas were sent to the adder. Its output is sent to the logic that calculates the EAC value (step 504). The calculated EAC value is now used to generate the GRS (step 310), and those results are used in step 312 to calculate the desired rounding result choice. The final selection of sum or sum+1 is ready before the actual sums are generated (step 306). Thus, the critical path is now defined by the steps enclosed in dotted-line box 500; the steps outside dotted-line box 500 are no longer in the critical path to complete the overall processing shown. Compare this with FIG. 3, where the critical path is shown enclosed in dotted-line box 316 and includes steps 310, 312, and 314. Using increased parallelism in the floating point execution unit has resulted in significantly fewer steps in the critical path, which results in a corresponding decrease in the amount of time it takes to complete floating point subtraction.

The invention increases throughput of a floating point execution unit by the addition of parallelism in the adder portion, and further provides for a method and system for finishing the computation of the EAC bit value, rounding choice, and GRS values before the summation of the mantissa portion of two floating point numbers is completed. In addition, using the output of the compare unit (already existing in floating point execution units) in this new and novel way allows the EAC bit value to be calculated with a minimal amount of additional circuitry or complexity in the target processor. This assures speed as well as using the least amount of space possible on a layout.

While embodiments and applications of this invention have been shown and described, it would be apparent to those of ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. A processor comprising:
   at least one local storage designed to contain a plurality of floating point values;
   at least one floating point execution unit, said floating point execution unit further including a separator configured to retrieve said plurality of floating point values from said local storage and make available a mantissa portion from and corresponding to each of said plurality of floating point values, said floating point execution unit further including at least one adder unit configured to receive said mantissas in an order and number determined by said adder unit;
   a compare unit operatively coupled to said at least one local storage further comprising a separator configured to retrieve said plurality of floating point values from said local storage and make available at least a mantissa portion of each of said floating point values, and the compare unit configured to make available a carry-out bit value resulting from an addition of said mantissas portions;
   an end-around-carry bit calculator unit operatively coupled to said compare unit and configured to provide a correct value of an end-around-carry calculation available as output, based on values received from said compare unit; and
   a rounding calculator operatively coupled to the end-around-carry bit calculator to calculate a rounding choice upon having the adder unit complete the addition and communicating the choice to the adder unit.

2. The processor of claim 1 where said compare unit further comprises as a component contained therein said end-around-carry bit calculator unit.

3. The processor of claim 1 where said at least one floating point execution unit further comprises as a component therein said end-around-carry bit calculator unit.

4. A method for computing a floating point subtraction comprising:
   (a) providing a first floating point value having a sign, an exponent, and a mantissa;
   (b) providing a second floating point value having a second sign, a second exponent, and a second mantissa;
   (c) performing a compare of said two floating point values and providing the output of said compare to an end-around-carry calculator unit;
   (d) calculating an end-around-carry value in said end-around-carry calculator unit;

(e) sending said first and second mantissas to an adder;
(f) aligning said second mantissa to said first mantissa in said adder;
(g) starting an addition of said first mantissa and a two's compliment form of said second mantissa in said adder;
(h) providing said calculated end-around-carry value;
(i) using said end-around-carry value to calculate a Guard Round Sticky and determine a rounding choice before said addition is completed;
(j) completing said addition in said adder;
(k) using said rounding choice to choose a correct rounded answer from said addition upon having said addition is completed; and
(l) providing a final answer using said rounding choice, said first and second signs, and said first and second exponents.

* * * * *